US012689587B2

(12) United States Patent
Zheng et al.

(10) Patent No.: US 12,689,587 B2
(45) Date of Patent: Jul. 21, 2026

(54) DATA TRANSMISSION METHOD FOR CLOUD APPLICATION, COMPUTING DEVICE, AND COMPUTER STORAGE MEDIUM

(71) Applicant: CLOUD INTELLIGENCE ASSETS HOLDING (SINGAPORE) PRIVATE LIMITED, Singapore (SG)

(72) Inventors: Wendan Zheng, Beijing (CN); Yujie Liu, Beijing (CN); Xiaowei Li, Shanghai (CN); Jiangwei Li, Beijing (CN); Hongbo Min, Shanghai (CN); Xiantao Zhang, Hangzhou (CN); Jinkui Ren, Hangzhou (CN)

(73) Assignee: CLOUD INTELLIGENCE ASSETS HOLDING (SINGAPORE) PRIVATE LIMITED, Singapore (SG)

( * ) Notice: Subject to any disclaimer, the term of this patent is extended or adjusted under 35 U.S.C. 154(b) by 58 days.

(21) Appl. No.: 18/867,620

(22) PCT Filed: May 15, 2023

(86) PCT No.: PCT/CN2023/094367
§ 371 (c)(1),
(2) Date: Nov. 20, 2024

(87) PCT Pub. No.: WO2023/221947
PCT Pub. Date: Nov. 23, 2023

(65) Prior Publication Data
US 2025/0330424 A1    Oct. 23, 2025

(30) Foreign Application Priority Data

May 20, 2022    (CN) ......................... 202210557130.X

(51) Int. Cl.
*H04L 47/10* (2022.01)
*H04L 43/08* (2022.01)
*H04L 67/10* (2022.01)

(52) U.S. Cl.
CPC .............. *H04L 47/10* (2013.01); *H04L 43/08* (2013.01); *H04L 67/10* (2013.01)

(58) Field of Classification Search
None
See application file for complete search history.

(56) References Cited

U.S. PATENT DOCUMENTS

2007/0130306 A1* 6/2007 Ofel ......................... H04L 43/55
709/223
2010/0135186 A1* 6/2010 Choong ................ H04L 43/026
370/253
(Continued)

FOREIGN PATENT DOCUMENTS

CN        111628847 A      9/2020
CN        112385308 A      2/2021
(Continued)

OTHER PUBLICATIONS

The search report of PCT application No. PCT/CN2023/094367 issued on Jul. 24, 2023.

*Primary Examiner* — Raqiul A Choudhury
(74) *Attorney, Agent, or Firm* — The Sun IP Law

(57) ABSTRACT

Embodiments of the present disclosure provide a data transmission method for a cloud application, a computing device and a computer storage medium. The data transmission method for the cloud application includes that: first network condition data of a cloud application client is obtained, where the first network condition data is obtained by monitoring data transmission condition between the cloud application client and a cloud application server; when the first network condition data meets a preset condition, a reference (Continued)

network condition is obtained; a data transmission way for the cloud application client is determined based on the reference network condition; and data transmission between the cloud application client and the cloud application server is performed according to the data transmission way. According to the technical solution provided by the embodiments of the present disclosure, the accuracy of determining the data transmission way is improved.

18 Claims, 6 Drawing Sheets

(56)                    References Cited

U.S. PATENT DOCUMENTS

| | | | | | |
|---|---|---|---|---|---|
| 2011/0142031 | A1* | 6/2011 | Jackson | ................... | H04L 12/66 |
| | | | | | 370/352 |
| 2017/0257324 | A1* | 9/2017 | Balmakhtar | ............ | H04L 41/40 |
| 2018/0270139 | A1* | 9/2018 | Singh | ................ | H04W 72/0453 |
| 2023/0188443 | A1* | 6/2023 | Shah | ................... | H04L 43/0829 |
| | | | | | 370/241 |

FOREIGN PATENT DOCUMENTS

| | | | |
|---|---|---|---|
| CN | 114338461 | A | 4/2022 |
| CN | 115086194 | A | 9/2022 |
| WO | 2019237856 | A1 | 12/2019 |

* cited by examiner

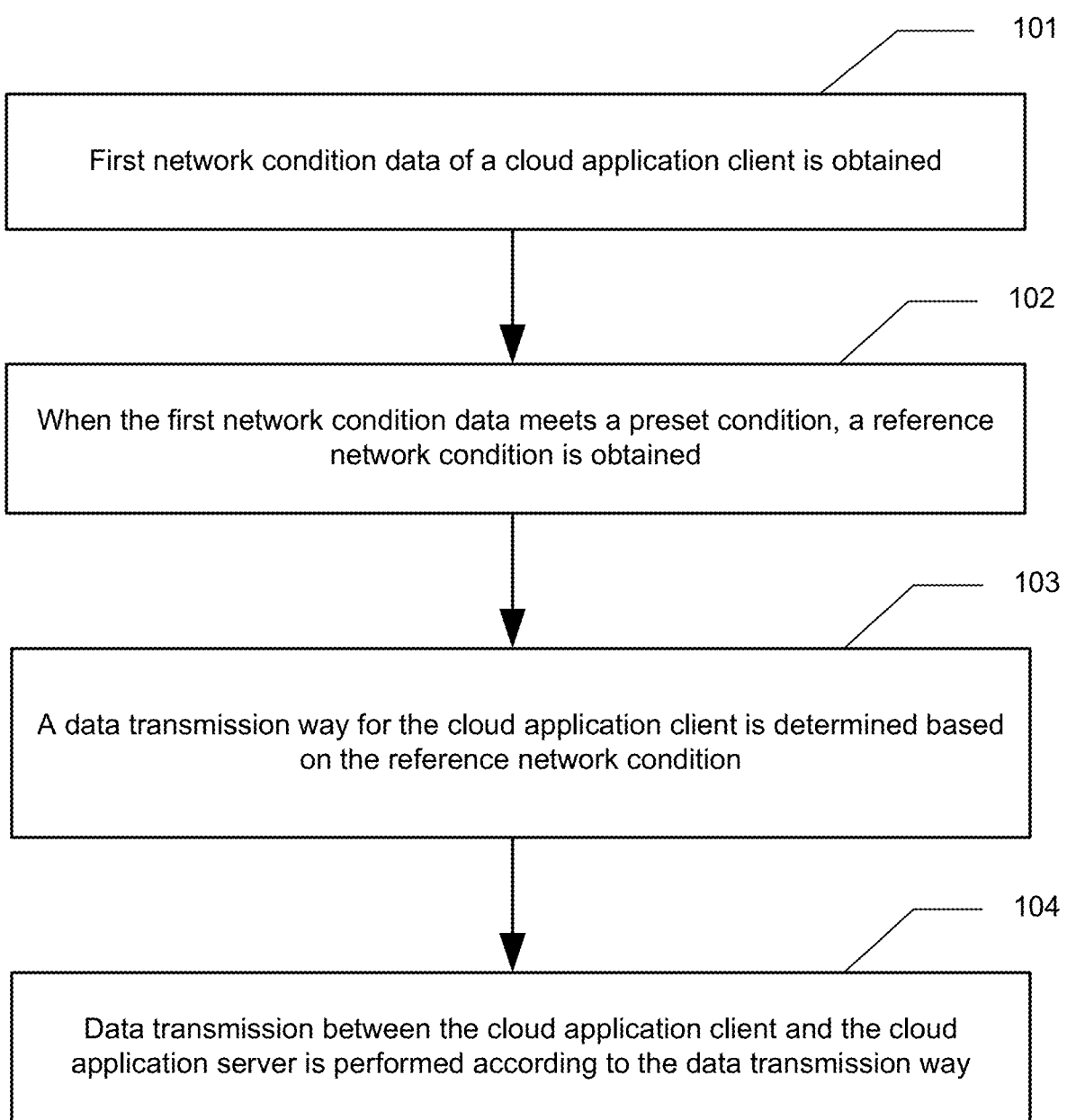

101

First network condition data of a cloud application client is obtained

102

When the first network condition data meets a preset condition, a reference network condition is obtained

103

A data transmission way for the cloud application client is determined based on the reference network condition

104

Data transmission between the cloud application client and the cloud application server is performed according to the data transmission way

First network condition data is obtained

402

When the first network condition data meets a preset condition, second network condition data is obtained

403

The second network condition data is sent to the cloud application server

501

First network condition data is obtained

502

When the first network condition data meets a preset condition, second network condition data is obtained

503

The second network condition data is sent to the cloud desktop server

504

Data to be displayed is obtained

505

The data to be displayed is displayed

DATA TRANSMISSION METHOD FOR CLOUD APPLICATION, COMPUTING DEVICE, AND COMPUTER STORAGE MEDIUM

The present disclosure claims priority of Chinese Patent Application No. 202210557130.X, filed to China Patent Office on May 20, 2022 and titled "Data Transmission Method for Cloud Application, Computing Device, and Computer Storage Medium", the content of which is hereby incorporated by reference in its entirety.

TECHNICAL FIELD

Embodiments of present disclosure relate to the technical field of cloud computing, and in particular to a data transmission method for a cloud application, a computing device, and a computer storage medium.

BACKGROUND OF THE INVENTION

With the continuous development of Internet technologies and cloud computing technologies, cloud applications are gradually widely used. A cloud application usually includes a cloud application client and a cloud application server. The cloud application client runs on a terminal device, and is connected with the cloud application server to control the cloud application server through an Internet or a local area network, so that a transaction logic or an operation task is completed at the cloud application server. The cloud application server performs data transmission with the cloud application client based on a pre-agreed communication protocol.

In the related art, the cloud application server may monitor a data transmission condition (for example, whether a packet is lost or not, a delay, or the like) between the cloud application server and the cloud application client to adjust a data transmission way (such as, increase a retransmission frequency, reduce a transmission bandwidth, and the like), to ensure smooth operation of the cloud application client.

However, in an actual application process, when the cloud application client is not operating in the terminal device, the amount of data generated is small, and the data transmission way determined according to the data transmission condition is not accurate enough to affect user experience for operating the cloud application client.

SUMMARY OF THE INVENTION

Embodiments of present disclosure provide a data transmission method for a cloud application, a computing device, and a computer storage medium.

According to a first aspect, some embodiments of present disclosure provide a data transmission method for a cloud application, including that:

first network condition data of a cloud application client is obtained, where the first network condition data is obtained by monitoring data transmission condition between the cloud application client and a cloud application server;

when the first network condition data meets a preset condition, a reference network condition is obtained;

a data transmission way for the cloud application client is determined based on the reference network condition; and data transmission between the cloud application client and the cloud application server is performed according to the data transmission way.

According to a second aspect, some embodiments of present disclosure provide another data transmission method for a cloud application, including that:

first network condition data is obtained, where the first network condition data is obtained by monitoring data transmission condition between the cloud application client and a cloud application server;

when the first network condition data meets a preset condition, second network condition data is obtained, where the second network condition data is generated by monitoring network transmission operation of at least one application running on the same terminal device with the cloud application client;

the second network condition data is sent to the cloud application server, so that the cloud application server determines the data transmission way for the cloud application client based on the second network condition data.

According to a third aspect, some embodiments of present disclosure provide another data transmission method for a cloud application, including that:

first network condition data is obtained, where the first network condition data is obtained by monitoring the data transmission condition between the cloud desktop client and the cloud desktop server;

when the first network condition data meets a preset condition, second network condition data is obtained, where the second network condition data is generated by monitoring network transmission operation of at least one application running on the same terminal device with the cloud desktop client;

the second network condition data is sent to the cloud desktop server, so that the cloud application server determines the data transmission way for the cloud desktop client;

data to be displayed is obtained, where the data to be displayed is sent by the cloud desktop server and transmitted to the cloud desktop client according to the data transmission way;

the data to be displayed is displayed.

According to a fourth aspect, some embodiments of present disclosure provide a server, including:

a first data obtaining module, arranged for obtaining first network condition data of a cloud application client, where the first network condition data is obtained by monitoring data transmission condition between the cloud application client and a cloud application server;

a second data obtaining module, arranged for, when the first network condition data meets a preset condition, obtaining a reference network condition;

a transmission way determining module, arranged for determining a data transmission way for the cloud application client based on the reference network condition; and a data transmission module, arranged for performing data transmission between the cloud application client and the cloud application server according to the data transmission way.

According to a fifth aspect, some embodiments of present disclosure provide a terminal device, including:

a third data obtaining module, arranged for obtaining first network condition data, where the first network condition data is obtained by monitoring data transmission condition between the cloud application client and a cloud application server;

a fourth data obtaining module, arranged for, when the first network condition data meets a preset condition, obtaining second network condition data, where the second network condition data is generated by monitoring network transmission operation of at least one application running on the same terminal device with the cloud application client; and a first data sending module, arranged for sending the second network condition data to the cloud application server, so that the cloud application server determines the data transmission way for the cloud application client based on the second network condition data.

According to a sixth aspect, some embodiments of present disclosure provide another terminal device, including:

a fifth data obtaining module, arranged for obtaining first network condition data, where the first network condition data is obtained by monitoring the data transmission condition between the cloud desktop client and the cloud desktop server;

a sixth data obtaining module, arranged for when the first network condition data meets a preset condition, obtaining second network condition data, where the second network condition data is generated by monitoring network transmission operation of at least one application running on the same terminal device with the cloud desktop client;

a second data sending module, arranged for sending the second network condition data to the cloud desktop server, so that the cloud application server determines the data transmission way for the cloud desktop client;

a seventh data obtaining module, arranged for obtaining data to be displayed, where the data to be displayed is sent by the cloud desktop server and transmitted to the cloud desktop client according to the data transmission way; and a display module, arranged for displaying the data to be displayed.

According to a seventh aspect, some embodiments of present disclosure provide a computing device, including a processing component and a storage component;

the storage component, arranged for storing at least one computer instruction used by the processing component to implement the data transmission methods for the cloud application mentioned above.

According to an eighth aspect, some embodiments of present disclosure provide a computer storage medium, storing a computer program, where the computer program, when executed by a computer, implements the data transmission methods for the cloud application mentioned above.

In some embodiments of the present disclosure, the first network condition data of the cloud application client is obtained, when the first network condition data meets the preset condition, the reference network condition is obtained, the data transmission way for the cloud application client is determined based on the reference network condition; and the data transmission between the cloud application client and the cloud application server is performed according to the data transmission way, which assist to determine a current real network condition of the cloud application client based on the reference network condition, so that the data transmission way can be determined according to the current real network condition, and the determination accuracy of the data transmission way can be improved.

These aspects or other aspects of present disclosure are more concise and easy to understand in the following descriptions of the embodiments.

BRIEF DESCRIPTION OF DRAWINGS

In order to more clearly illustrate the embodiments of the present disclosure or the technical solutions in the related art, accompanying drawings required in the description of the embodiments or the related art will be briefly described below, and obviously, the drawings in the following description are some embodiments of the present disclosure, and for those of ordinary skill in the art, other drawings may be obtained according to these drawings without creative efforts.

FIG. 1 schematically shows a flowchart of a data transmission method for a cloud application according to an embodiment of the present disclosure.

DETAILED DESCRIPTION OF THE INVENTION

Figure 2:
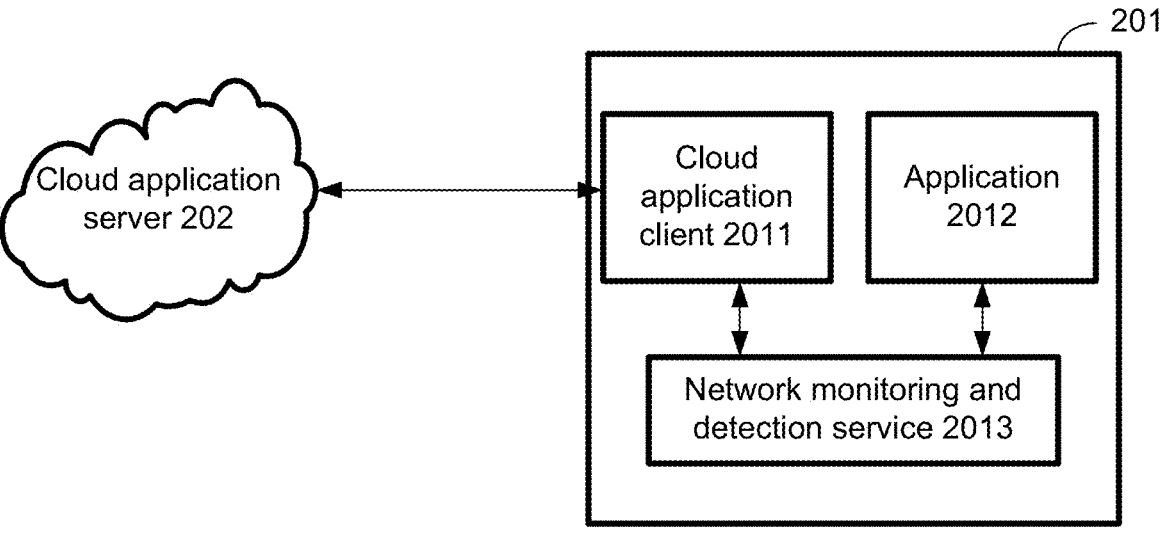
FIG. 2 schematically shows a schematic diagram of obtaining a reference network condition according to an embodiment of the present disclosure.

To enable the skilled person in the art to better understand the solutions of present disclosure, the technical solutions in the embodiments of present disclosure are clearly and completely described with reference to the accompanying drawings in the embodiments of present disclosure.

In some processes described in the specification and claims of present disclosure and the foregoing accompanying drawings, multiple operations occurring in a specific order are included. It should be clear that the operations may not be performed or performed in parallel according to the order in which the operations appear. The sequence numbers (such as 101, 102, etc.) of the operations are used for distinguishing different operations, and the sequence numbers do not represent any execution order. In addition, these processes may include more or fewer operations, and these operations may be performed sequentially or in parallel. It should be noted that descriptions such as "first" and "second" herein are used for distinguishing different messages, devices, modules, etc. do not represent a sequence, and "first" and "second" are further not defined as different types.

The technical solutions in the embodiments of present disclosure are clearly and completely described below with reference to the accompanying drawings in the embodiments of present disclosure. All other embodiments obtained by the skilled person in the art based on the embodiments of present disclosure without creative efforts shall fall within the protection scope of present disclosure.

Implementation details of the technical solutions of the embodiments of present disclosure are described in detail below.

FIG. 1 schematically shows a flowchart of a data transmission method for a cloud application according to an embodiment of the present disclosure. The data transmission method for the cloud application may be performed by a cloud application server, and includes the following steps.

In step 101, first network condition data of a cloud application client is obtained, where the first network condition data is obtained by monitoring data transmission condition between the cloud application client and a cloud application server.

In step 102, when the first network condition data meets a preset condition, a reference network condition is obtained.

In step 103, a data transmission way for the cloud application client is determined based on the reference network condition.

In step 104, data transmission between the cloud application client and the cloud application server is performed according to the data transmission way.

According to some embodiments of the present disclosure, the cloud application includes a cloud desktop application, a cloud game application, etc. Correspondingly, the cloud application client may be a cloud desktop client or a cloud game client, and the cloud application server may be a cloud desktop server or a cloud game server.

According to some embodiments of the present disclosure, the first network condition data is obtained by monitoring the data transmission condition between the cloud application server and the cloud application client, but is not limited thereto, and the cloud application client further monitors the data transmission condition between the cloud application server and the cloud application server, and then send the monitoring result to the cloud application server, so as to make the cloud application server obtain the first network condition data.

According to an embodiment of the present disclosure, the cloud application client and the cloud application server usually perform data transmission based on a pre-agreed communication protocol. Thus, the first network condition data is obtained by monitoring a data transmission condition based on a communication protocol.

According to some embodiments of the present disclosure, the first network condition data is used for representing a data transmission quantity, a data transmission quality, and the like between the cloud application client and the cloud application server.

According to an embodiment of the present disclosure, the preset condition includes at least one of a data transmission amount being less than a preset threshold and a network quality being poor. The representation of the network quality being poor includes a high packet loss rate, a large delay, and the like.

According to some embodiments of the present disclosure, the cloud application client running on the terminal device usually obtains the data to be displayed from the cloud application server and displays the data to be displayed when screen display of the cloud application client is required to be updated. Therefore, the cloud application client and the cloud application server perform data transmission when the screen display of the cloud application client is required to be updated.

In an actual application scenario, for example, after a user starts the cloud application client, the cloud application client is not operated for a certain time period, the screen display of the cloud application client is stationary, and there is no need to update the screen display. At this time, keep-alive heartbeat time information is transmitted between the cloud application client and the cloud application server, and there is no data transmission. For another example, when the user controls the cloud application client to perform a slower operation for updating the screen display such as reading a document, there is a small amount of data transmission between the cloud application client and the cloud application server.

In the related art, the cloud application server generally depends on monitoring the data transmission situation between the cloud application client and the cloud application server to determine a network condition of network environment where the cloud application client is currently located, so as to determine the data transmission way corresponding to the network condition where the cloud application client is located.

In the above application scenario, the first network condition data indicates that the amount of data transmission between the cloud application client and the cloud application server is small, and the data transmission way determined by the cloud application server depending on the first network condition data in the related art is generally not applicable to the real network condition where the cloud application client is located.

Based on this, in the case that the first network condition data is determined to meet a preset condition, the data transmission way is not determined based on the first network condition data, but the reference network condition data is additionally obtained to determine the data transmission way for the cloud application client based on the reference network condition data.

According to some embodiments of the present disclosure, the reference network condition data includes network condition data obtained by performing the network condition monitoring operation except the data transmission condition between the cloud application client and the cloud application server and this network condition data is capable of reflecting a current real network environment state of the cloud application client.

In some embodiments of the present disclosure, the first network condition data of the cloud application client is obtained, when the first network condition data meets the preset condition, the reference network condition is obtained, the data transmission way for the cloud application client is determined based on the reference network condition; and the data transmission between the cloud application client and the cloud application server is performed according to the data transmission way, which assist to determine a current real network condition of the cloud application client based on the reference network condition, so that the data transmission way can be determined according to the current real network condition, and the determination accuracy of the data transmission way can be improved.

According to an embodiment of the present disclosure, the step 102 is specifically implemented as follows.

Second network condition data sent from the cloud application client is obtained, where the second network condition data is generated by monitoring network transmission operation of at least one application running on the same terminal device with the cloud application client.

The second network condition data is set as the reference network condition.

According to some embodiments of the present disclosure, in an actual application scenario, when the first network condition data indicates that the data transmission quantity between the cloud application client and the cloud application server is small, the cloud application client sends a network condition monitoring request to the terminal device, and the terminal device determines, in response to the network condition monitoring request, whether the terminal device runs the application except the cloud application client, monitor the network transmission operation of this application, and return a monitoring result to the cloud application client.

According to an embodiment of the present disclosure, in an actual application scenario, the user pauses during using the cloud application client, and simultaneously opens a local browser in the terminal device to browse a webpage. At this time, the screen display of the cloud application client is stationary, and a keep-alive heartbeat event is transmitted between the cloud application client and the cloud application server.

In this case, the real network condition of the cloud application client cannot be learned through transmission data detection between the cloud application client and the cloud application server. Then, the cloud application client sends the network condition monitoring request to the terminal device, and the terminal device monitors, in real time, the network data transmission of the cloud application running on the terminal device by using a network monitoring and detection service in response to the network condition monitoring request. Since the user at this time browses the webpage by using the local browser, the network monitoring and detection service detects the reference network condition data according to the network data transmission generated by the local browser, so that the reference network condition data is returned to the cloud application server.

When the user ends the local webpage browsing and starts to operate the cloud application client, the cloud application server determines an appropriate data transmission way according to the reference network environment data reflecting the local network environment of the user, to ensure a smooth and seamless experience of the cloud application client for the user.

According to some embodiments of the present disclosure, in another actual application scenario, the user reads the document by using the cloud application client. At this time, a updating speed of the screen display of the cloud application client is slower, and the amount of data transmission between the cloud application client and the cloud application server is small.

In this case, the real network condition of the cloud application client cannot be learned through transmission data detection between the cloud application client and the cloud application server. Then, the cloud application client sends the network condition monitoring request to the terminal device, and the terminal device monitors, in real time, the network data transmission of the application running on the terminal device by using the network monitoring and detection service in response to the network condition monitoring request. When there is other network interaction performed by the user at this time, the network monitoring and detection service still detects the reference network condition data, and return the reference network condition data to the cloud application server, so that the cloud application server selects a data transmission way suitable for the current network condition for the user according to the reference network condition data, to ensure the use experience of the cloud application client for the user and to reduce the bandwidth occupation.

FIG. 2 schematically shows a schematic diagram of obtaining a reference network condition according to an embodiment of the present disclosure.

As shown in FIG. 2, a reference number 201 indicates a terminal device. A cloud application client 2011, an application 2012, and a network monitoring and detection service 2013 run on the terminal device 201. A reference number 202 indicates a cloud application server.

When it is determined that the first network condition data meets the preset condition, the network monitoring and detection service 2013 monitors the network transmission operation of the application 2012, and sends the monitored network data to the cloud application client 2011. After receiving the network data, the cloud application client 2011 sends the network data, which is set as a reference network condition, to the cloud application server 202.

According to another embodiment of the present disclosure, the step 102 is specifically implemented as follows.

Device information, sent by a cloud application client, of a terminal device, where the cloud application client is located, is obtained.

Third network condition data matching the device information is found from pre-configured network condition data.

The third network condition data is set as the reference network condition data.

According to some embodiments of the present disclosure, the pre-configured network condition data records reference device information in a preset historical period and reference network condition data corresponding to the reference device information. The reference device information and the reference network condition data corresponding to the reference device information is obtained from other cloud application servers, and/or the cloud application server collects the reference device information and the reference network condition data corresponding to the device information of the cloud application client in the historical period.

According to some embodiments of the present disclosure, after obtaining the device information, the device information may be traversed and matched with the reference device information recorded in the pre-configured network condition data to determine the reference device information matching the device information, so as to determine the reference network condition data corresponding to the reference device information as the third network condition data.

According to some embodiments of the present disclosure, the data transmission method for the cloud application further includes the following step.

The pre-configured network condition data is updated according to the first network condition data, the device information, and the corresponding data transmission way.

According to some embodiments of the present disclosure, after the data transmission way for the cloud application client is determined according to the reference network condition data, the first network condition data, the device information, and the corresponding data transmission way are recorded into the pre-configured network condition data to update the network condition data, and a historical data basis is provided for subsequent determination of the data transmission way.

According to some embodiments of the present disclosure, an operation of finding the third network condition data matching the device information is specifically implemented as the following step.

The third network condition data corresponding to the device information and a time range in which a current time point is located.

According to some embodiments of the present disclosure, the device information includes physical location information where a device is located, and the physical location information includes longitude and latitude where the device is located, a name of a building where the device is located, etc.

According to the physical location information and the time range in which a current time point is located, the network condition of the physical location at this time point in the historical period is found from the pre-configured network condition data. In the same physical position, the network condition at each moment in the day has regularity, for example, for an office building, the network condition is usually poor due to the fact that the network occupation amount is relatively large, and the network condition is generally great for the off-duty time.

Therefore, the network condition data of the same location found from the pre-configured network condition data according to the physical location information and the time range in which the current time point is located can truly reflect the current network environment status of the cloud application client.

Figure 3:
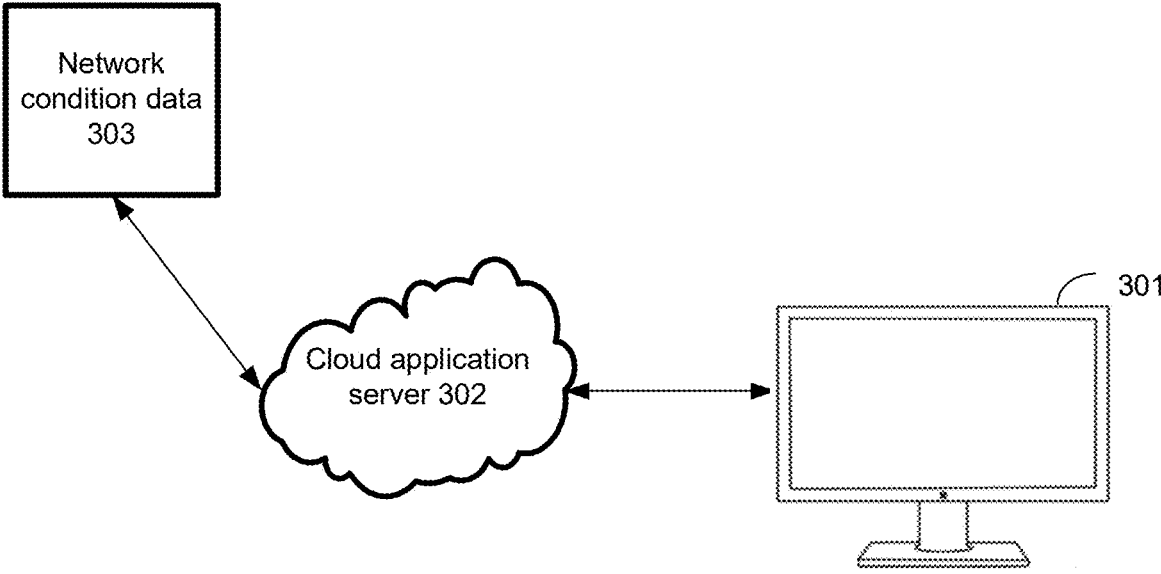
FIG. 3 schematically shows a schematic diagram of obtaining a reference network condition according to another embodiment of the present disclosure.

FIG. 3 schematically shows a schematic diagram of obtaining a reference network condition according to another embodiment of the present disclosure.

When the first network condition data is determined to meet the preset condition, the cloud application client 301 sends the physical location information of the physical device where the cloud application client 301 is located and the time range in which the current time point is located to the cloud application server 302.

After the cloud application server 302 obtains the physical location information from the cloud application client 301 and the time range in which the current time point is located, the cloud application server 302 finds the pre-configured network condition data 303, and determines the third network condition data found from the pre-configured network condition data 303 as the reference network condition data.

According to some embodiments of the present disclosure, the pre-configured network condition data is stored in a data storage medium of the cloud application server, but is not limited thereto, and is further stored in another storage medium different from the cloud application server.

According to another embodiment of the present disclosure, the operation of obtaining the reference network condition is specifically implemented as the following steps.

Second network condition data sent from the cloud application client is obtained, where the second network condition data is generated by monitoring network transmission operation of at least one application running on the same terminal device with the cloud application client. Device information of a terminal device sent by the cloud application client is obtained.

Third network condition data matching the device information is found from pre-configured network condition data.

The second network condition data is merged with the third network condition data to obtain the reference network condition data.

According to some embodiments of the present disclosure, the second network condition data generated by monitoring the network transmission operation of the at least one application running in the same terminal device with the cloud application client and the third network condition data found from the pre-configured network condition data are used as reference data for determining the reference network condition data, so that the second network condition data and the third network condition data are merged to determine the final reference network condition data.

According to an embodiment of the present disclosure, the accuracy of the reference network condition data can be improved by integrating the second network condition data and the third network condition data to determine the reference network condition data.

According to some embodiments of the present disclosure, an operation of merging the second network condition data and the third network is specifically implemented as the following steps.

A first weight factor corresponding to the second network condition data is determined.

A second weight factor corresponding to the third network condition data is determined.

The second network condition data and the third network condition data are respectively processed by using the first weight factor and the second weight factor to generate fourth network condition data and fifth network condition data.

The fourth network condition data and the fifth network condition data are summed to generate reference network condition data.

According to some embodiments of the present disclosure, based on the reference network condition, an operation of determining the data transmission way for the cloud application client is specifically implemented as the following steps.

A target network condition type is determined from multiple pre-created candidate network condition types based on a reference network condition.

The data transmission way is determined according to the target network condition type.

According to some embodiments of the present disclosure, the following Table One schematically shows a network condition candidate table according to some embodiments of the present disclosure.

TABLE ONE

| Network characteristics | Network condition type | Data transmission way |
|---|---|---|
| Large latency, severe delay jitter, packet loss | A first candidate network condition type | Reduce data transmission, lower transmission bandwidth, and alleviate network congestion |
| Low latency, severe packet loss, high competitiveness, and high randomness in packet loss occurrence | A second candidate network condition type | Increase the number of retransmissions, seize bandwidth by intensifying the retransmission mechanism, and there is a certain degree of waste in data transmission |
| Low latency, random packet loss | A third candidate network condition type | Resend the specified data packets through the NACK (Non-Acknowledge, a notification technology) mechanism, solving the problem without wasting bandwidth |

According to some embodiments of the present disclosure, after obtaining the reference network condition, the reference network condition is parsed to determine network characteristics of the reference network condition.

After determining the network characteristic of the reference network condition, the network condition type matched with the network characteristic is found from Table One, and the data transmission way corresponding to the network condition type is determined accordingly.

Figure 4:
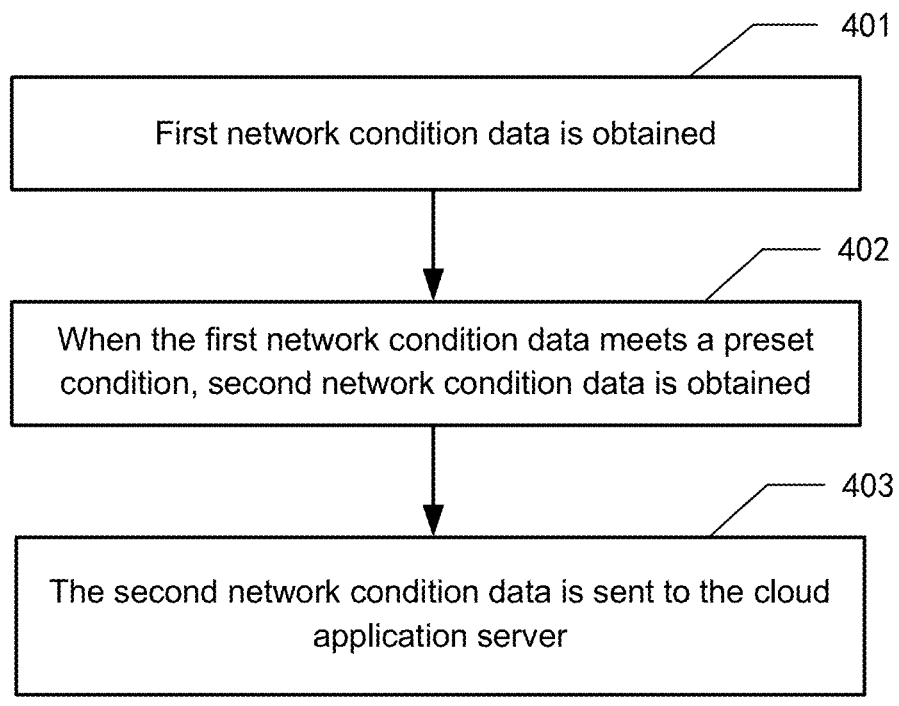
FIG. 4 schematically shows a flowchart of a data transmission method for a cloud application according to another embodiment of the present disclosure.

FIG. 4 schematically shows a flowchart of a data transmission method for a cloud application according to another embodiment of the present disclosure, and the method is performed by a cloud application client, which includes the following steps.

In step 401, first network condition data is obtained, where the first network condition data is obtained by monitoring data transmission condition between the cloud application client and a cloud application server.

In step 402, when the first network condition data meets a preset condition, second network condition data is obtained, where the second network condition data is generated by monitoring network transmission operation of at least one application running on the same terminal device with the cloud application client.

In step 403, the second network condition data is sent to the cloud application server, so that the cloud application server determines the data transmission way for the cloud application client based on the second network condition data.

Figure 5:
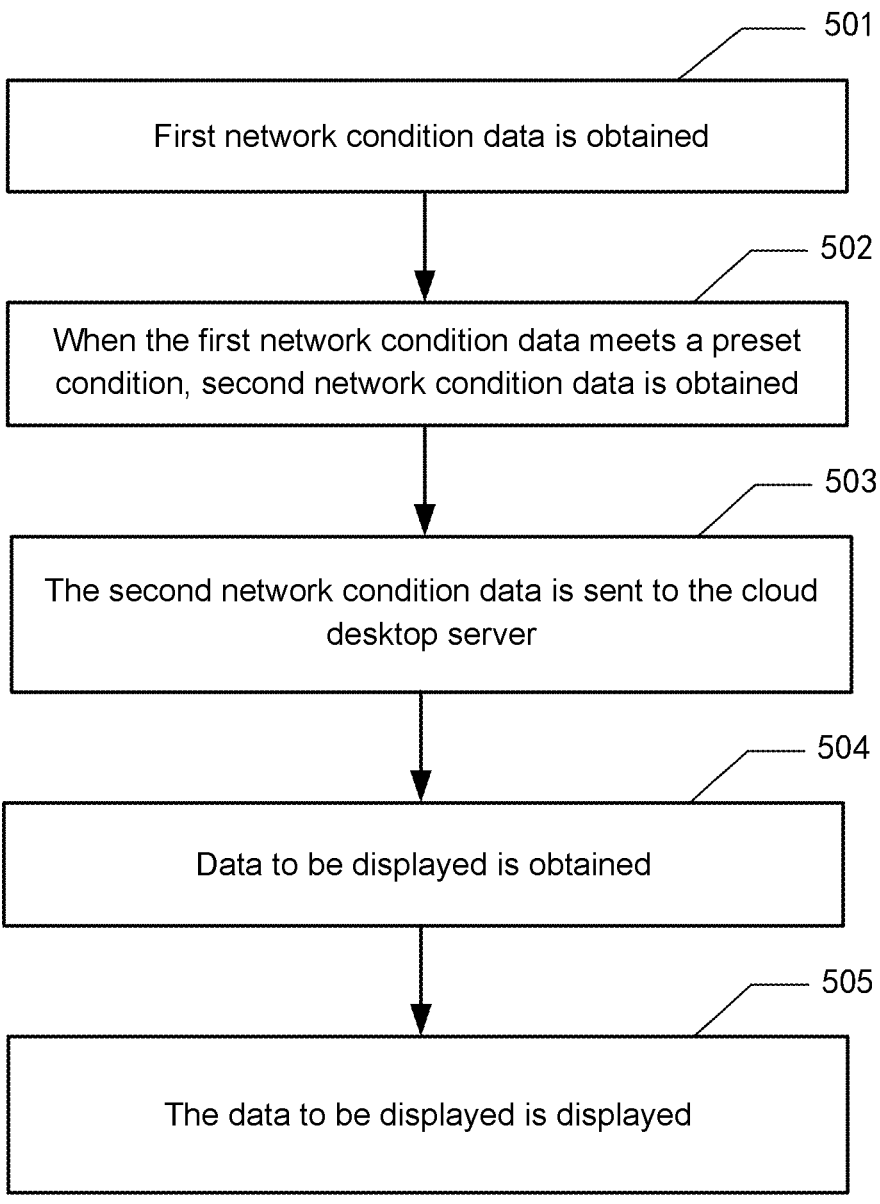
FIG. 5 schematically shows a flowchart of a data transmission method for a cloud application according to another embodiment of the present disclosure.

FIG. 5 schematically shows a flowchart of a data transmission method for a cloud application according to another embodiment of the present disclosure, and the method is performed by a cloud application client, which includes the following steps.

In step 501, first network condition data is obtained, where the first network condition data is obtained by monitoring the data transmission condition between the cloud desktop client and the cloud desktop server.

In step 502, when the first network condition data meets a preset condition, second network condition data is obtained, where the second network condition data is generated by monitoring network transmission operation of at least one application running on the same terminal device with the cloud desktop client.

In step 503, the second network condition data is sent to the cloud desktop server, so that the cloud application server determines the data transmission way for the cloud desktop client.

In step 504, data to be displayed is obtained, where the data to be displayed is sent by the cloud desktop server and transmitted to the cloud desktop client according to the data transmission way.

In step 505, the data to be displayed is displayed.

Figure 6:
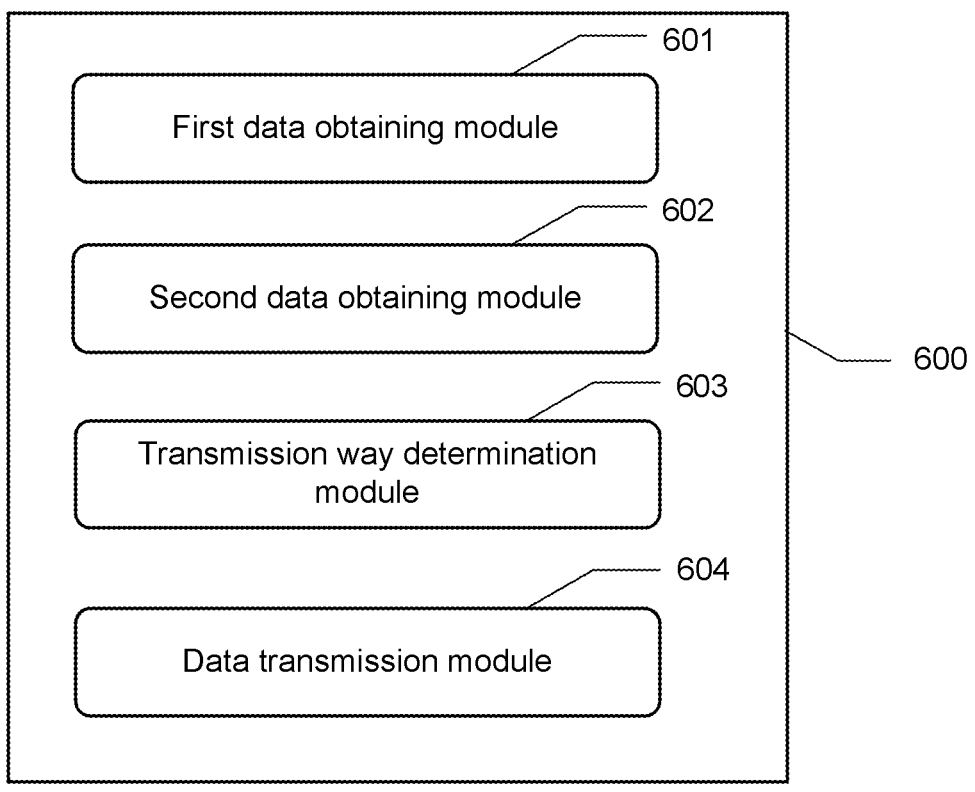
FIG. 6 schematically shows a block diagram of a server according to an embodiment of the present disclosure.

FIG. 6 schematically shows a block diagram of a server according to an embodiment of the present disclosure. The server 600 includes a first data obtaining module 601, a second data obtaining module 602, a transmission way determination module 603, and a data transmission module 604.

The first data obtaining module 601 is arranged for obtaining first network condition data of a cloud application client, where the first network condition data is obtained by monitoring data transmission condition between the cloud application client and a cloud application server.

The second data obtaining module 602 is arranged for, when the first network condition data meets a preset condition, obtaining a reference network condition.

The transmission way determining module 603 is arranged for determining a data transmission way for the cloud application client based on the reference network condition.

The data transmission module 604 is arranged for performing data transmission between the cloud application client and the cloud application server according to the data transmission way.

According to some embodiments of the present disclosure, the second data obtaining module 602 includes:
a first data obtaining unit, arranged for obtaining second network condition data sent from the cloud application client, where the second network condition data is generated by monitoring network transmission operation of at least one application running on the same terminal device with the cloud application client; and
a first reference data determining unit, arranged for setting the second network condition data as the reference network condition.

According to some embodiments of the present disclosure, the second data obtaining module 602 includes:
a first information obtaining unit, arranged for obtaining device information of a terminal device where the cloud application client is located;
a data determining unit, arranged for finding third network condition data matching the device information from pre-configured network condition data; and
a second reference data determining unit, arranged for setting the third network condition data as the reference network condition.

According to some embodiments of the present disclosure, the data determining unit includes:
a data finding subunit, arranged for finding the third network condition data corresponding to the device information and a time range in which a current time point is located.

According to some embodiments of the present disclosure, the second data obtaining module 602 includes:
a condition obtaining unit, arranged for obtaining second network condition data sent from the cloud application client, where the second network condition data is generated by monitoring network transmission operation of at least one application running on the same terminal device with the cloud application client;
a second information obtaining unit, arranged for obtaining device information of a terminal device sent by the cloud application client;
a data finding unit, arranged for finding third network condition data matching the device information from pre-configured network condition data; and
a merging unit, arranged for merging the second network condition data with the third network condition data to obtain the reference network condition data.

According to some embodiments of the present disclosure, the transmission way determining module 603 includes:
a type determining unit, arranged for determining a target network condition type from a pre-defined set of candidate network condition types based on the reference network condition; and
an adjusting unit, arranged for adjust an initial data transmission way according to the target network condition type to determine a data transmission way.

According to some embodiments of the present disclosure, the server 600 further includes:
an updating module, arranged for updating the pre-configured network condition data through the first network condition data, the device information, and the corresponding data transmission way.

The terminal device in FIG. 6 performs the data transmission method for the cloud application in the embodiment shown in FIG. 1, and the implementation principle and technical effect thereof are not described again. Specific manners in which the modules and units perform operations in the terminal device or apparatus in the foregoing embodiments have been described in detail in the embodiments related to the method, which will not be elaborated herein.

Figure 7:
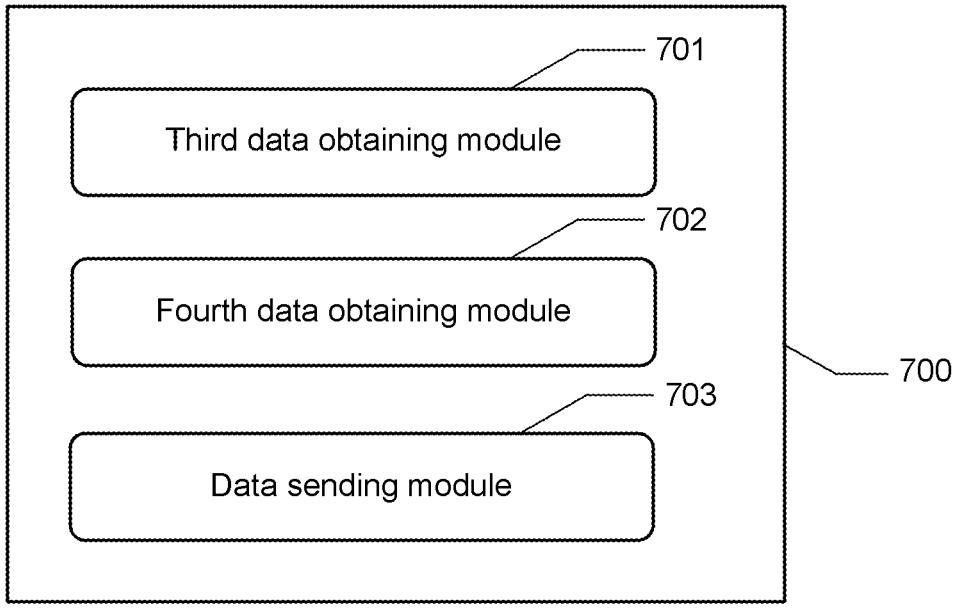
FIG. 7 schematically shows a block diagram of a terminal device according to an embodiment of the present disclosure.

FIG. 7 schematically shows a block diagram of a terminal device according to an embodiment of the present disclosure, and the terminal device 700 includes a third data obtaining module 701, a fourth data obtaining module 702, and a data sending module 703.

The third data obtaining module 701 is arranged for obtaining first network condition data, where the first network condition data is obtained by monitoring data transmission condition between the cloud application client and a cloud application server.

The fourth data obtaining module 702 is arranged for, when the first network condition data meets a preset condition, obtaining second network condition data, where the second network condition data is generated by monitoring network transmission operation of at least one application running on the same terminal device with the cloud application client.

The data sending module 703 is arranged for sending the second network condition data to the cloud application server, so that the cloud application server determines the data transmission way for the cloud application client based on the second network condition data.

The terminal device in FIG. 7 performs the data transmission method for the cloud application in the embodiment shown in FIG. 4, and the implementation principle and technical effect thereof are not described again. Specific manners in which the modules and units perform operations in the terminal device or apparatus in the foregoing embodiments have been described in detail in the embodiments related to the method, which will not be elaborated herein.

Figure 8:
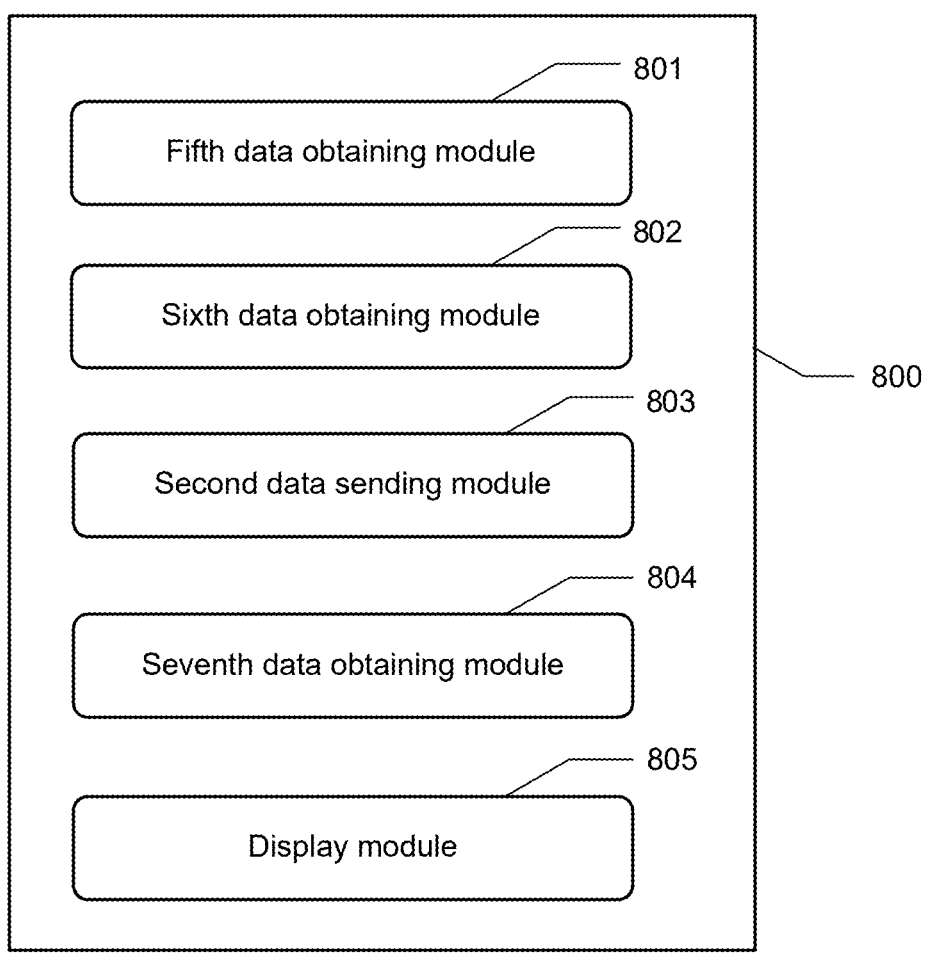
FIG. 8 schematically shows a block diagram of a terminal device according to another embodiment of the present disclosure.

FIG. 8 schematically shows a block diagram of a terminal device according to an embodiment of the present disclosure, and the terminal device 800 includes a fifth data obtaining module 801, a sixth data obtaining module 802, a second data sending module 803, a seventh data obtaining module 804, and a display module 805.

The fifth data obtaining module 801 is arranged for obtaining first network condition data, where the first network condition data is obtained by monitoring the data transmission condition between the cloud desktop client and the cloud desktop server.

The sixth data obtaining module 802 is arranged for, when the first network condition data meets a preset condition, obtaining second network condition data, where the second network condition data is generated by monitoring network transmission operation of at least one application running on the same terminal device with the cloud desktop client.

The second data sending module 803 is arranged for sending the second network condition data to the cloud desktop server, so that the cloud application server determines the data transmission way for the cloud desktop client.

The seventh data obtaining module 804 is arranged for obtaining data to be displayed, where the data to be displayed is sent by the cloud desktop server and transmitted to the cloud desktop client according to the data transmission way.

The display module 805 is arranged for display data to be displayed.

The terminal device in FIG. 8 performs the data transmission method for the cloud application according to the embodiment shown in FIG. 5, and the implementation principle and technical effect thereof are not described again. Specific manners in which the modules and units perform operations in the terminal device or apparatus in the foregoing embodiments have been described in detail in the embodiments related to the method, which will not be elaborated herein.

Figure 9:
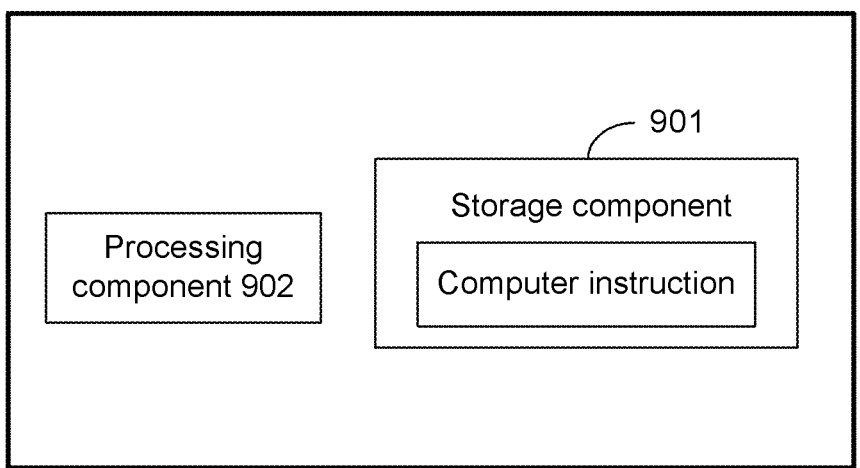
FIG. 9 schematically shows a block diagram of a computing device according to an embodiment of the present disclosure.

In a possible design, the user terminal and/or the server provided in this embodiment of the present disclosure is implemented as a computing device, as shown in FIG. 9, and the computing device may include a storage component 901 and a processing component 902.

The storage component 901 is arranged for storing at least one computer instruction used by the processing component 902 to implement the data transmission methods for the cloud application provided in the embodiments of the present disclosure.

Certainly, the computing device further includes other components, for example, an input/output interface, a communication component, or the like. The input/output interface provides an interface between the processing component and the peripheral interface module, and the peripheral interface module is an output device, an input device, or the like. The communication component is arranged for facilitating wired or wireless communication between the computing device and other devices.

The computing device is a physical device or an elastic computing host provided by the cloud computing platform. In this case, the computing device is a cloud server, and the processing component, the storage component, and the like are basic server resources rented or purchased from the cloud computing platform.

When the computing device is a physical device, the computing device is implemented as a distributed cluster composed of multiple servers or terminal devices is implemented, or the computing device is implemented as a single server or a single terminal device.

In an actual application, the computing device specifically deploys nodes in a message queue system, to implement a producer, a consumer, a transit server, or a named server in the message queue system.

An embodiment of present disclosure further provides a computer-readable storage medium, storing a computer program, where when the computer program is executed by a computer, the data transmission methods for the cloud application provided in the embodiments of the present disclosure are implemented.

An embodiment of present disclosure further provides a computer program product, including a computer program, where when the computer program is executed by a computer, the data transmission methods for the cloud application provided in the embodiments of the present disclosure are implemented.

The processing component in the foregoing corresponding embodiments may include at least one processor to execute computer instructions to complete all or part of the steps in the foregoing methods. Of course, the processing component include at least one application specific integrated circuit (ASIC), digital signal processor (DSP), digital signal processing device (DSPD), programmable logic device (PLD), field programmable gate array (FPGA), controller, microcontroller, microprocessor, or other electronic component for performing the above-described methods.

The storage component is arranged for storing various types of data to support operation in the device. The storage component is implemented by any type of transitory or non-transitory storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

It may be clearly understood by the skilled person in the art that, for the purpose of convenient and brief description, for a detailed working process of the foregoing system, apparatus, and unit, reference may be made to a corresponding process in the foregoing method embodiments, and details are not described herein again.

The apparatus embodiments described above are illustrative, where the units described as separate parts may or may not be physically separate, and parts displayed as units may or may not be physical units, may be located in one position, or may be distributed on multiple network units. Some or all of the modules may be selected according to actual needs to achieve the objectives of the solutions of the embodiments. The skilled person in the art may understand and implement the embodiments without creative efforts.

Through the description of the above embodiments, the skilled person in the art may clearly understand that the embodiments may be implemented by means of software plus a necessary general hardware platform, and of course, may also be implemented by hardware. Based on such an understanding, the above technical solution essentially or the part contributing to the related art may be embodied in the form of a software product, and the computer software product may be stored in a computer-readable storage medium, such as a ROM/RAM, a magnetic disk, an optical disk, etc. and includes multiple instructions for causing a computer device (which may be a personal computer, a server, or a network device) to perform the method according to some embodiments or some parts of the embodiments.

Finally, it should be noted that the above embodiments are used for illustrating the technical solutions of the present disclosure and are not limited thereto. Although the present disclosure has been described in detail with reference to the foregoing embodiments, it should be understood by the skilled person in the art that the above embodiments may still modify the technical solutions described in the foregoing embodiments, or equivalently replace some of the technical features therein; and these modifications or replacements do not make the essence of the corresponding technical solutions separate from the spirit and scope of the technical solutions of the embodiments of present disclosure.

The invention claimed is:

1. A data transmission method for a cloud application, comprising:

obtaining first network condition data of a cloud application client, where in the first network condition data is obtained by monitoring data transmission condition between the cloud application client and a cloud application server;

when the first network condition data meets a preset condition, obtaining a reference network condition;

determining a data transmission way for the cloud application client based on the reference network condition;

performing data transmission between the cloud application client and the cloud application server according to the data transmission way;

wherein obtaining the reference network condition comprises: obtaining second network condition data sent from the cloud application client, wherein the second network condition data is generated by monitoring network transmission operation of at least one application running on the same terminal device with the cloud application client; obtaining device information of a terminal device sent by the cloud application client; finding third network condition data matching the device information from pre-configured network condition data; determining a first weighting factor corresponding to the second network condition data; determining a second weighting factor corresponding to the third network condition data; processing the second network condition data and the third network condition data according to the first weighting factor and the second weighting factor respectively to generate fourth network condition data and fifth network condition data; and summing the fourth network condition data and the fifth network condition data to generate the reference network condition.

2. The method as claimed in claim 1, wherein obtaining the reference network condition comprises:

obtaining second network condition data sent from the cloud application client, wherein the second network condition data is generated by monitoring network transmission operation of at least one application running on the same terminal device with the cloud application client;

setting the second network condition data as the reference network condition.

3. The method as claimed in claim 1, wherein obtaining the reference network condition comprises:

obtaining device information of a terminal device where the cloud application client is located;

finding third network condition data matching the device information from pre-configured network condition data;

setting the third network condition data as the reference network condition.

4. The method as claimed in claim 3, wherein finding the third network condition data matching the device information comprises:

finding the third network condition data corresponding to the device information and a time range in which a current time point is located.

5. The method as claimed in claim 1, wherein determining the data transmission way for the cloud application client based on the reference network condition comprises:

determining a target network condition type from a predefined set of candidate network condition types based on the reference network condition;

determining the data transmission way based on the target network condition type.

6. The method as claimed in claim 3, further comprising:

updating the pre-configured network condition data through the first network condition data, the device information, and the corresponding data transmission way.

7. A computing device, comprising: a processor and a memory;

the memory, arranged for storing at least one computer instruction used by the processor to implement the following steps:

obtaining first network condition data of a cloud application client, where in the first network condition data is obtained by monitoring data transmission condition between the cloud application client and a cloud application server;

when the first network condition data meets a preset condition, obtaining a reference network condition;

determining a data transmission way for the cloud application client based on the reference network condition;

performing data transmission between the cloud application client and the cloud application server according to the data transmission way;

wherein obtaining the reference network condition comprises: obtaining second network condition data sent from the cloud application client, wherein the second network condition data is generated by monitoring network transmission operation of at least one application running on the same terminal device with the cloud application client; obtaining device information of a terminal device sent by the cloud application client; finding third network condition data matching the device information from pre-configured network condition data; determining a first weighting factor corresponding to the second network condition data; determining a second weighting factor corresponding to the third network condition data; processing the second network condition data and the third network condition data according to the first weighting factor and the second weighting factor respectively to generate fourth network condition data and fifth network condition data; and summing the fourth network condition data and the fifth network condition data to generate the reference network condition.

8. A non-transitory computer storage medium storing a computer program, wherein the computer program, when executed by a computer, implements the following steps:

obtaining first network condition data of a cloud application client, where in the first network condition data is obtained by monitoring data transmission condition between the cloud application client and a cloud application server;

when the first network condition data meets a preset condition, obtaining a reference network condition;

determining a data transmission way for the cloud application client based on the reference network condition;

performing data transmission between the cloud application client and the cloud application server according to the data transmission way;

wherein obtaining the reference network condition comprises: obtaining second network condition data sent from the cloud application client, wherein the second network condition data is generated by monitoring network transmission operation of at least one application running on the same terminal device with the cloud application client; obtaining device information of a terminal device sent by the cloud application client; finding third network condition data matching the device information from pre-configured network condition data; determining a first weighting factor corresponding to the second network condition data; determining a second weighting factor corresponding to the third network condition data; processing the second network condition data and the third network condition data according to the first weighting factor and the second weighting factor respectively to generate fourth network condition data and fifth network condition data; and summing the fourth network condition data and the fifth network condition data to generate the reference network condition.

9. The method as claimed in claim 1, wherein the cloud application client is a cloud desktop client or a cloud gaming client, and the cloud application server is a cloud desktop server or a cloud gaming server.

10. The method as claimed in claim 1, wherein the cloud application client and the cloud application server perform data transmission based on a pre-agreed communication protocol, and the first network condition data is obtained by monitoring data transmission situation based on the communication protocol.

11. The method as claimed in claim 1, wherein the first network condition data is used for representing at least one of data transmission volume and data transmission quality between the cloud application client and the cloud application server.

12. The method as claimed in claim 11, wherein the preset condition comprises at least one of the following:

the data transmission volume is less than a preset threshold;

a data transmission packet loss rate is greater than a packet loss rate threshold; and a data transmission delay is greater than a delay threshold.

13. The method as claimed in claim 1, wherein the reference network condition comprises: network condition obtained through network condition monitoring operation in addition to monitoring the data transmission condition between the cloud application client and the cloud application server.

14. The method as claimed in claim 1, wherein the reference network condition is used for assisting in determining actual network status of the cloud application client and determining the data transmission way based on the actual network status.

15. The method as claimed in claim 3, wherein the pre-configured network condition data is used for recording reference device information and reference network condition data corresponding to the reference device information in a preset historical period.

16. The method as claimed in claim 4, where in the device information comprises physical location information of the terminal device.

17. The method as claimed in claim 16, wherein finding the third network condition data corresponding to the device information and the time range in which the current time point is located comprises:

finding network status of the physical location information at a current time point in the historical period from the pre-configured network condition data based on the physical location information and the time range in which the current time point is located.

18. The method as claimed in claim 5, where in determining the target network condition type from the pre-defined set of candidate network condition types based on the reference network condition comprises:

analyzing the reference network condition to determine network characteristics of the reference network condition;

finding the target network condition type matching the network characteristics from the pre-defined set of candidate network condition types.

* * * * *